United States Patent [19]

Iguchi et al.

[11] Patent Number: 4,850,047
[45] Date of Patent: Jul. 18, 1989

[54] OPTICAL BUS COMMUNICATION SYSTEM UTILIZING FRAME FORMAT SIGNALS

[75] Inventors: Kazuo Iguchi, Yokohama; Tetsuo Soejima, Tama; Shigeo Amemiya; Hiroaki Komine, both of Kawasaki, all of Japan

[73] Assignee: Fujitsu Limited, Kawasaki, Japan

[21] Appl. No.: 86,807

[22] Filed: Aug. 19, 1987

[30] Foreign Application Priority Data

Aug. 29, 1986 [JP] Japan ................................. 61-203430
Nov. 19, 1986 [JP] Japan ................................. 61-275707
Jan. 14, 1987 [JP] Japan ................................. 62-006460
Jun. 11, 1987 [JP] Japan ........................... 62-089010[U]

[51] Int. Cl.$^4$ .............................................. H04B 9/00
[52] U.S. Cl. ........................................ 455/612; 370/4; 455/600; 455/607; 455/617
[58] Field of Search ............... 455/600, 601, 603, 606, 455/607, 617, 618, 619, 612, 613, 610, 609, 605, 608, 611; 370/4

[56] References Cited

U.S. PATENT DOCUMENTS 4,517,456 5/1985 Halsall et al. ...................... 455/610

FOREIGN PATENT DOCUMENTS 0113401 10/1978 Japan ..................................... 370/4
0114638 7/1983 Japan ................................. 455/612
0062749 4/1985 Japan ................................. 455/600
0075138 4/1985 Japan ................................. 455/601

Primary Examiner—Robert L. Griffin
Assistant Examiner—Leslie Van Beek
Attorney, Agent, or Firm—Staas & Halsey

[57] ABSTRACT

An optical bus type communication system comprises a bus type transmission line consisting of an optical fiber, a light source provided at the one end of the bus type transmission line for sending an optical signal having a constant level to the bus type transmission line, a plurality of optical switches mounted on the bus type transmission line, and a plurality of terminal interfaces. Each terminal interface sends data by switching the corresponding optical switch so that the optical signals on the transmission line are modulated with the data.

18 Claims, 12 Drawing Sheets

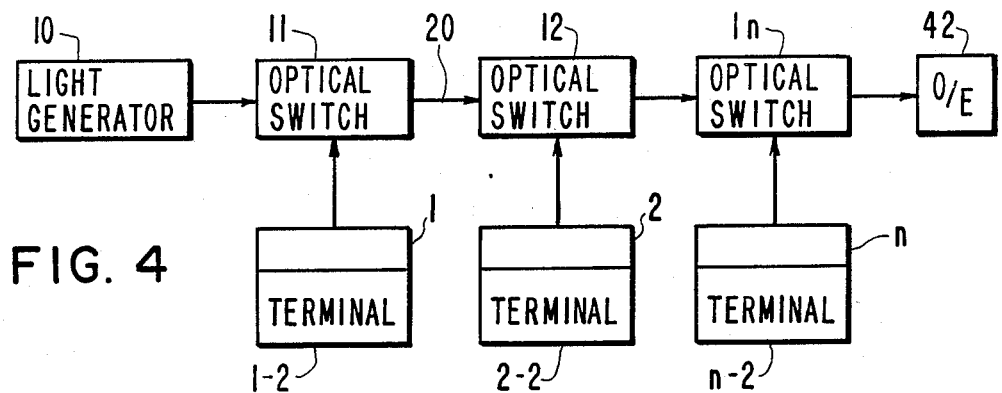
FIG. 4
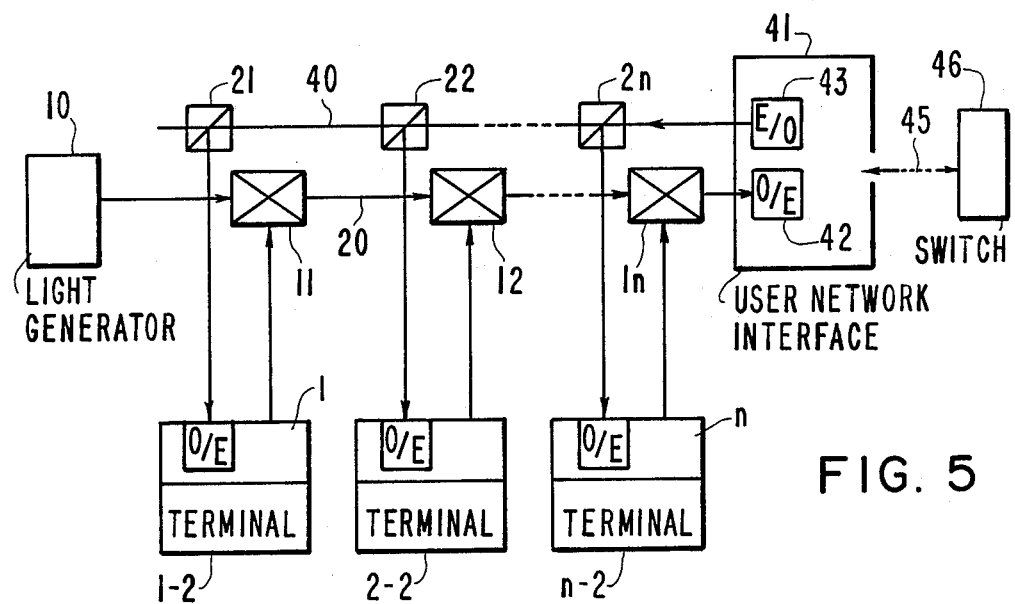
FIG. 5
FIG. 6(a)
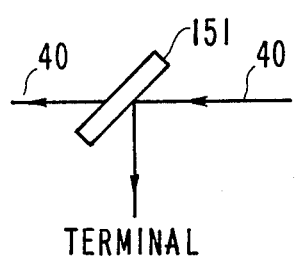
FIG. 6(b)
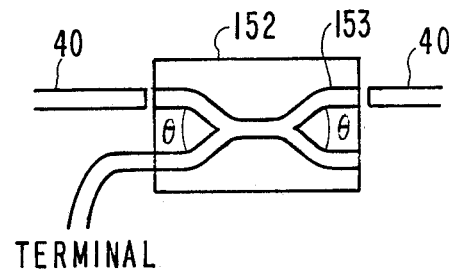

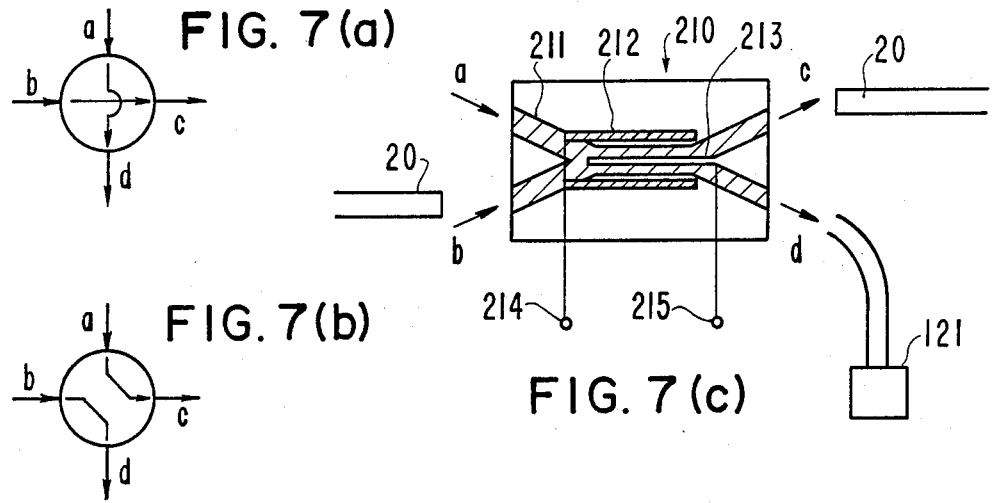
FIG. 7(a)
FIG. 7(b)
FIG. 7(c)
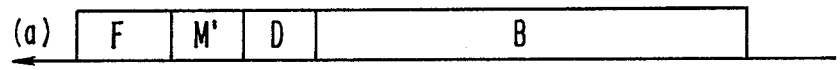
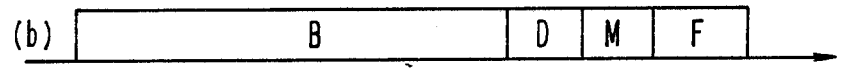
FIG. 8
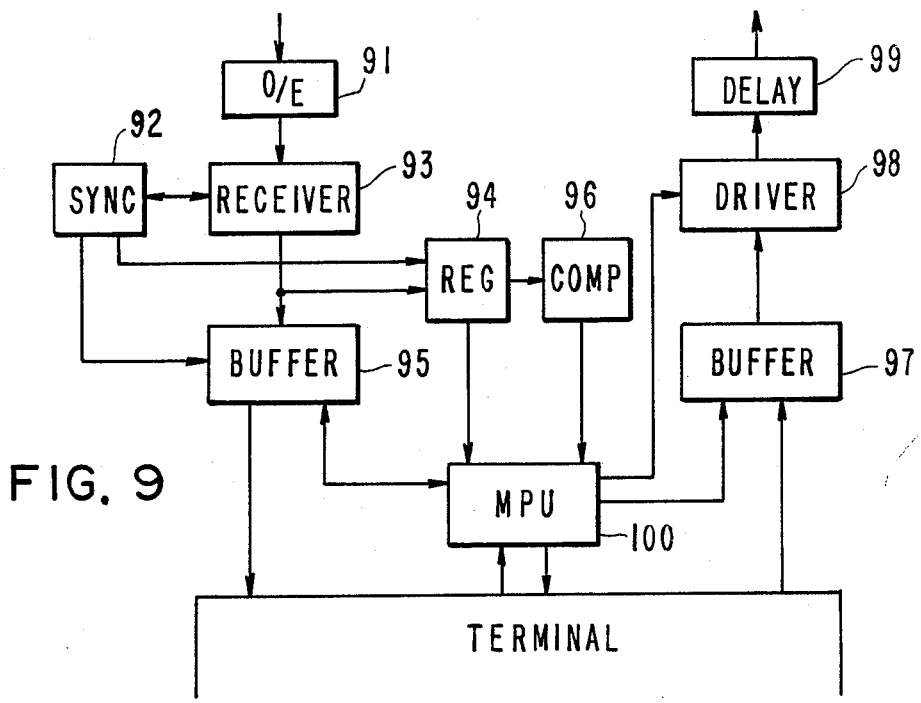
FIG. 9

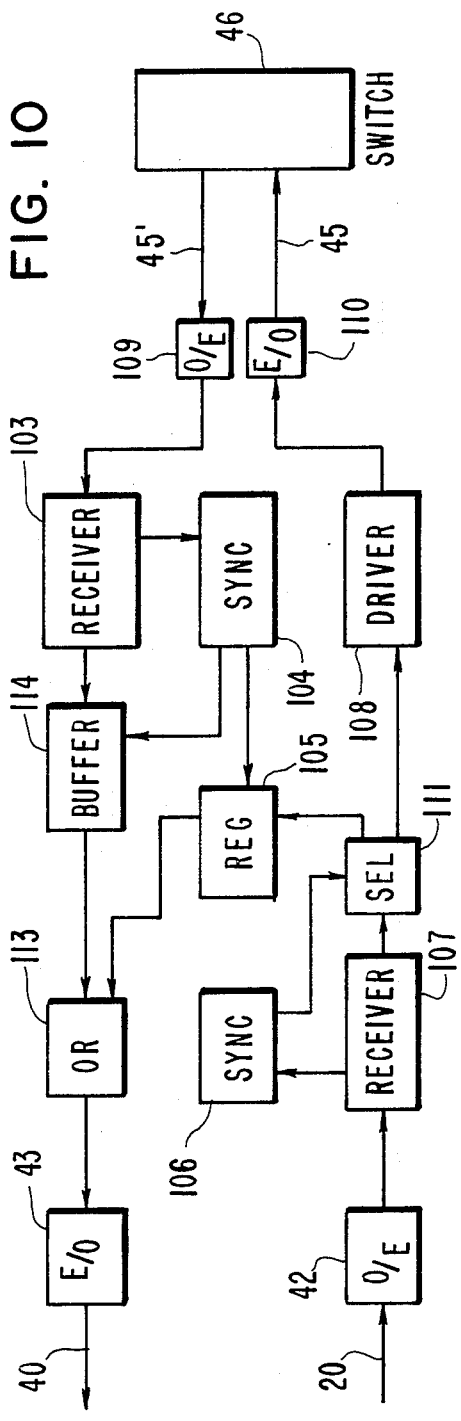
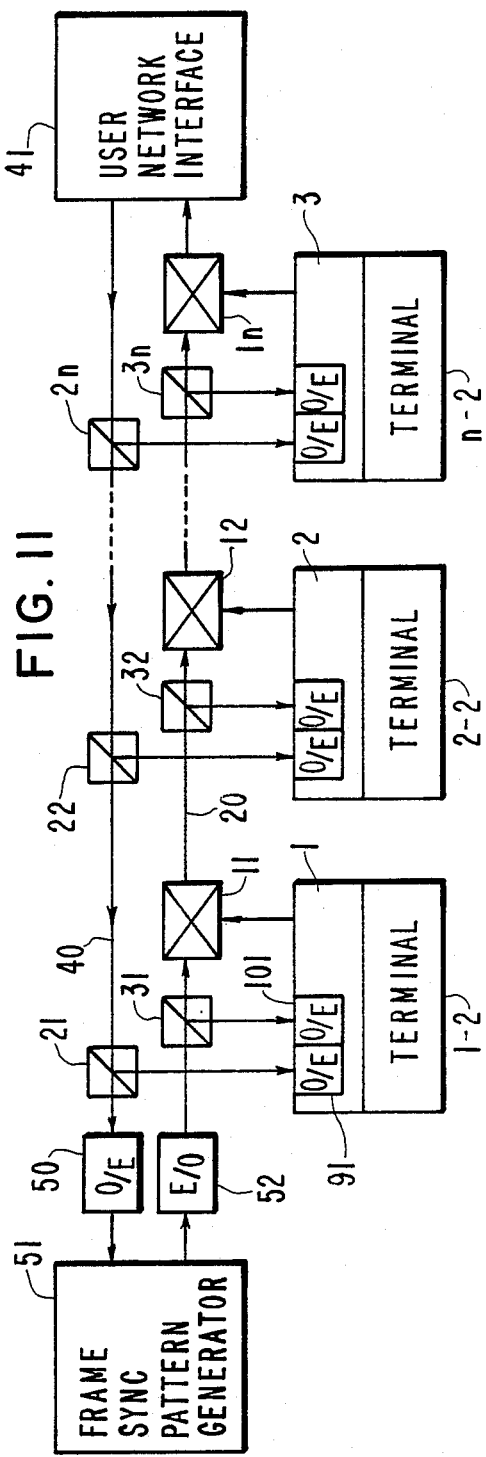

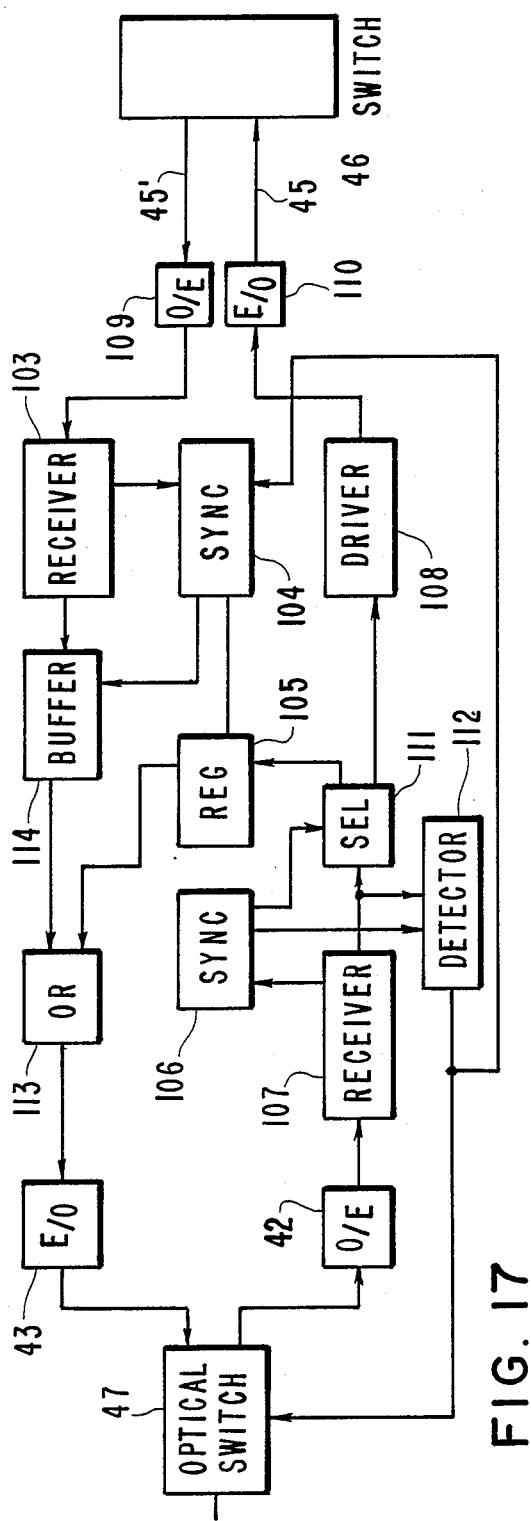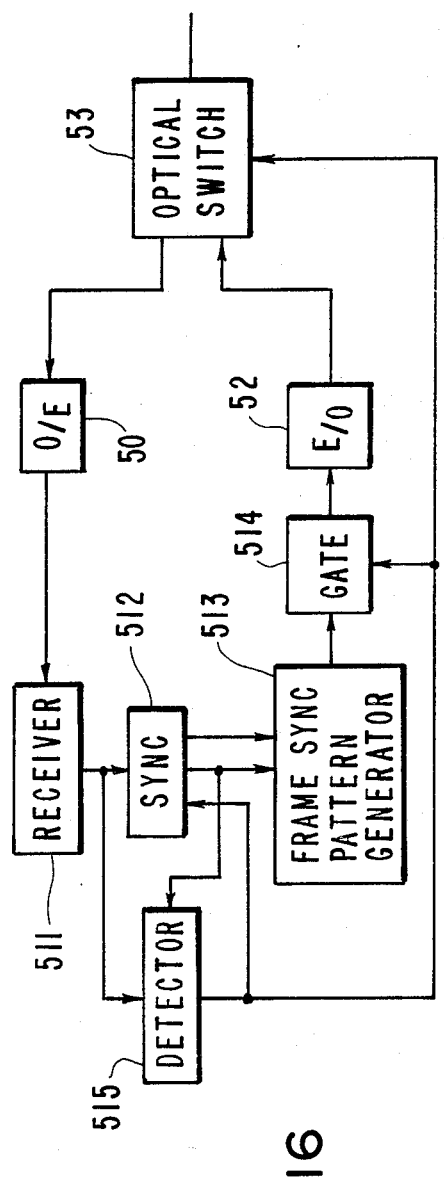
FIG. 17
FIG. 16

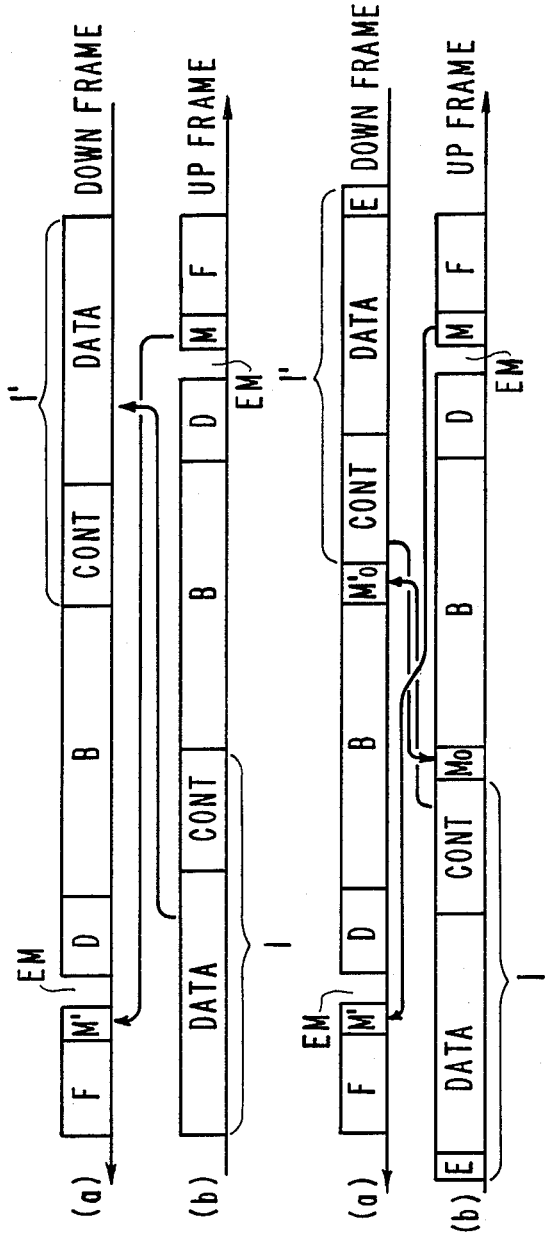
FIG. 22
FIG. 23
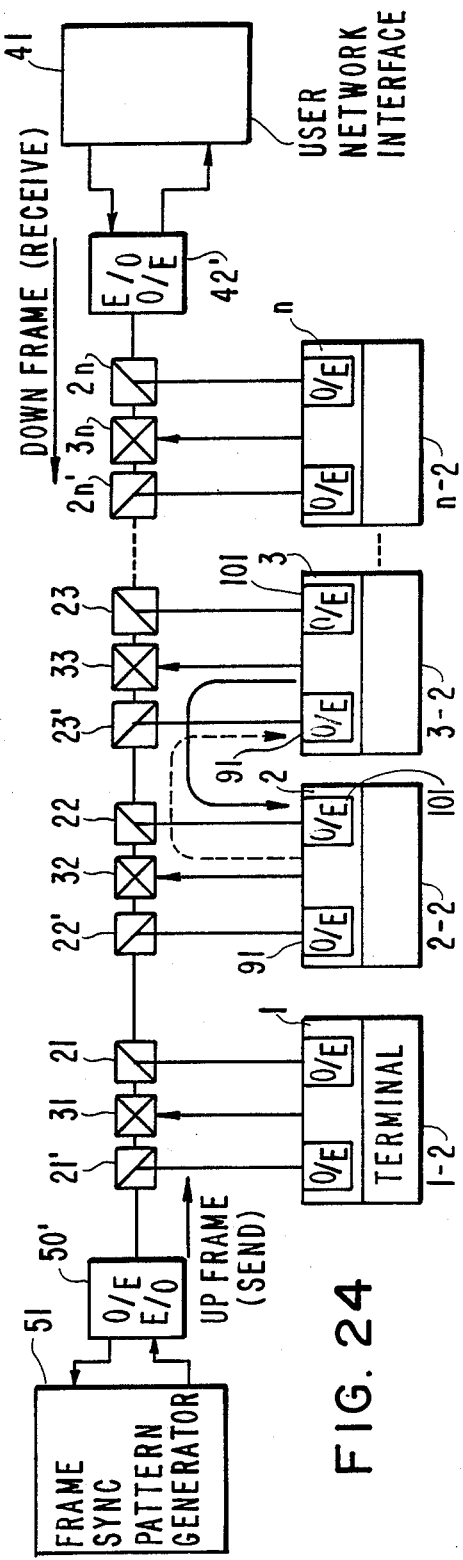
FIG. 24

OPTICAL BUS COMMUNICATION SYSTEM UTILIZING FRAME FORMAT SIGNALS

BACKGROUND OF THE INVENTION

1. Field of the Invention

The present invention relates to an optical bus type communication system which is suitable for the ISDN user network and local area network.

2. Description of the Related Art

In a local area network, an optical communication is employed and is put into practical use in order to cope with requirements in high speed and large capacity communication for increased amounts of information.

The ISDN user network which is widely investigated now is in the trend of employing an optical communication in order to realize higher and larger capacity communication.

An optical bus type communication system is typical as the system structure to realize such requirement. FIG. 1 indicates a system structure in case such an optical bus type communication system is adopted into the ISDN user network.

In FIG. 1, an optical signal sent from a user network interface 41 with the switching network is branched by optical couplers 21, 22, . . . , 2n inserted along an optical fiber 40 and is then distributed to terminals 1-3, 2-3, . . . , n-3.

The optical sending signals from respective terminals 1-3, 2-3, . . . , n-3 are combined by optical couplers 31, 32, . . . , 3n inserted on an optical fiber 20, transmitted to the user network interface 41, received by a data receiving part 42 and transmitted to switching equipment 46 through subscriber lines 45 passing the controller 44.

In this case, the optical sending signal from the furthest terminal 1-3 from the user network interface 41 reaches the user network interface 41 passing all optical couplers 31, 32, . . . , 3n and full length of the optical fiber 20. Therefore, it shows largest loss. Meanwhile the optical sending signal from the nearest terminal n-3 to the user network interface 41 reaches the interface passing only the optical coupler 3n and the optical fiber 20 up to the user network interface 41. Therefore it shows smallest loss.

The data receiving part 42 of user network interface 41 is provided with an automatic gain controlling function which makes small variation of output level due to input level difference, but in case optical output levels from respective terminals and coupling coefficients of the optical couplers 31, 32, . . . , 3n are equal, the response time of automatic gain controlling function becomes longer. Accordingly, discrimination error may be generated during this response time because optical receiving levels are remarkably different if, for example, a first signal is input from the nearest terminal n-3 and then another signal is input immediately after such first signal from the furthest terminal 1-3.

Therefore, optical couplers having different coupling coefficients are used or light emitting elements having different optical output levels are used, so that the optical sending signal levels from respective terminals are almost equal at the receiving point of the user network interface 31. However, this results in a problem in that difficult adjustment is still required.

Meanwhile, in such optical bus type communication system that the fixed channels are generally not assigned to respective terminals, and these terminals have one or a plurality of channels in common.

Accordingly, in some cases a plurality of terminals may simultaneously access the same channel. In this case, the optical signals transmitted from these terminals collide, a plurality of optical signals overlap, and thereby the optical receiving level at the data receiving part 42 within the user network interface 41 increases. As described previously, when collision of signals occurs, even if the optical receiving level of the data receiving part 42 is equalized in case each terminal solely transmits optical signal by adjusting optical couplers and light emitting elements of respective terminals, the optical signals from a plurality of terminals selected freely overlap and thereby the optical receiving level of data receiving part 42 varies.

Such a problem also occurs in the case of an optical LAN illustrated in FIG. 2 (Local Area Network). Namely, in the optical LAN, the user network interface 41 does not exist and communication between terminals is carried out by forming the U-shaped optical fiber with the optical fibers 40 and 20. In this case, a problem similar to that occurring in the data receiving part 42 in the user network interface 41 also occurs.

This problem also occurs in the optical LAN indicated in FIG. 3.

In the structure illustrated in FIG. 3, the main station 41' controls the right for making access to substations 1-3, n-3 (terminals). The main station 41' and a plurality of substations 1-n, n-3 are connected through optical couplers 21, 2n and 31, 3n provided on the two lines of optical fiber cables (or buses) 40', 20'. The optical coupler 2n on the down-line optical bus 40' branches the signal from the main station 41' and inputs this signal to the corresponding substation n-3 and causes the signal to pass through to the optical coupler 21 in the succeeding stage. The optical couplers 31, 3n on the up-line optical bus 20' also has similar function.

In this optical bus type communication system, since the signal is branched or inserted through the optical coupler as the bus access element for both up-and down-lines, the optical signal from the nearest substation n-3 of the up-line 20' is input to the main station 41' almost without transmission loss, but the optical signal from the furthest substation 1-3 is input to the main station 41' having suffered to transmission loss every time it passed an optical coupler. Therefore, a difference is present in the level of optical pulses received by the main station 41'. Moreover, in case competition occurs in optical pulses transmitted from the substations, the pulses overlap. As a result, the amplitude becomes equal to several times of the amplitude in the case when competition does not occur between the input pulse of the main station 41'. When a signal pulse having such a large level difference is input to the main station, the AGC (Automatic Gain Controller: not illustrated) in the main station 41' cannot follow the signal pulse, resulting in a problem in that the receiving data cannot be read.

SUMMARY OF THE INVENTION

Therefore, it is an object of the present invention to provide an optical bus type communication system which is always capable of keeping an optical signal level on the optical bus to a constant value.

It is another object of the present invention to provide said optical bus type communication system with very simple structure.

According to the present invention, an optical bus type communication system is provided comprising:

a first bus type transmission line consisting of an optical fiber, a light source, provided at a first end of said first bus type transmission line, for sending an optical signal having a constant level to said first bus type transmission line, a plurality of optical switches inserted mounted on said first bus type transmission line, a plurality of terminal interfaces, provided at corresponding optical switches, respectively, for digitally modulating optical signals of constant level which pass through said first bus type transmission line by switching said optical switches corresponding to the data to be sent to said first bus type transmission line, and a main station, provided at a second end of said first bus type transmission line, having receiving means for receiving the digitally modulated optical signals.

BRIEF DESCRIPTION OF THE DRAWINGS

FIG. 4 indicates a principle structure of the present invention;

FIG. 5 indicates the first embodiment of the present invention;

FIG. 6 indicates structures of optical couplers;

FIG. 7b and 7c illustrate operation and a structure of an optical switch according to the present invention;

FIG. 8 indicates frame formats of the embodiment of the present invention illustrated in FIG. 5, FIG. 9 is a block diagram of a terminal interface;

FIG. 10 is a block diagram of a user network interface;

FIG. 11 illustrates a second embodiment of the present invention;

FIG. 16 is a block diagram of a frame synchronous signal generating circuit according to the third embodiment;

FIG. 17 is a block diagram of a user network interface;

FIG. 22 and FIG. 23 are frame formats for extension line communication;

FIG. 24 illustrates a sixth embodiment of extension line communication of the present invention;

Through the drawings, like numerals indicate like parts.

DESCRIPTION OF THE PREFERRED EMBODIMENT

Figure 1:
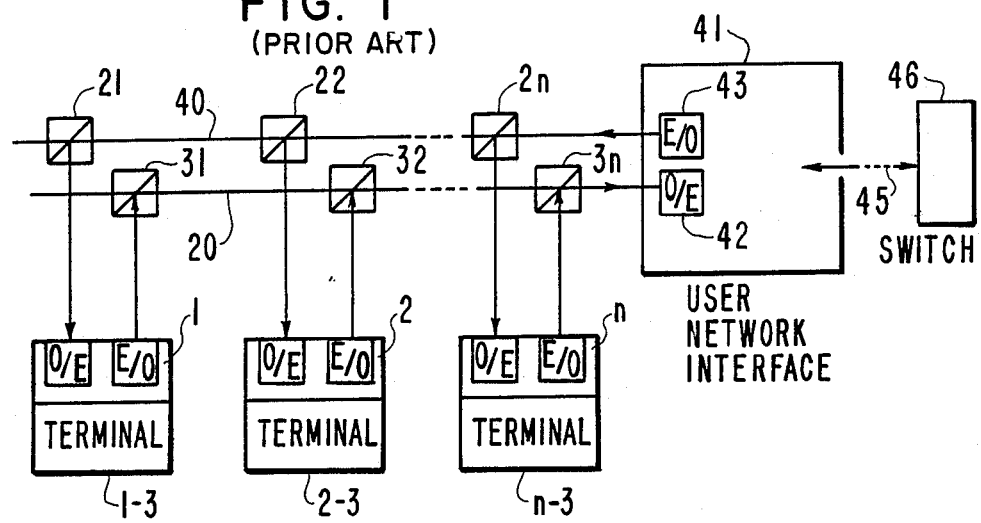
FIG. 1 indicates a system structure for an optical bus type communication system.
Figure 2:
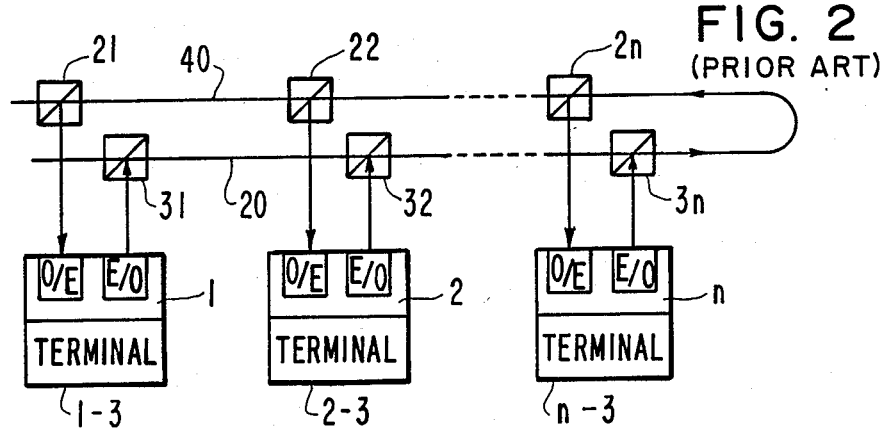
FIG. 2 and FIG. 3 indicate system structures for optical local area networks.
Figure 3:
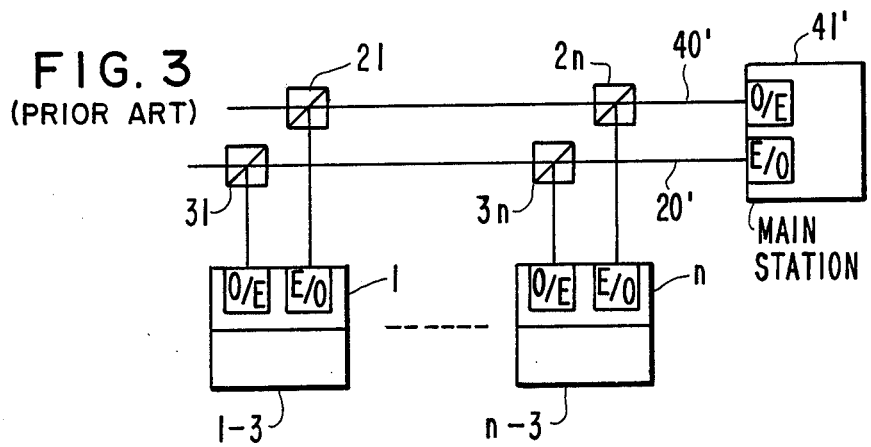

FIG. 4 is a block diagram indicating the principle structure of the present invention. In view of solving problems explained previously, a light emitting source 10 (a laser diode or an LED (Light Emitting Diode)) is provided at one end of an optical fiber 20 which forms the optical bus. DC light of a constant level is always input to the optical fiber from the light source 10. Each terminal 1-2, 2-2, ... n-2 sends data through modulation of the DC light on the optical bus 20 by turning ON and OFF corresponding optical switches 11, 12, ... 1n corresponding to the sending data on the occasion of sending data to the optical bus 20. Thereby, an optical level at the optical receiver 42 provided at the other end of optical bus is constant. Accordingly, it is no longer necessary to adjust the optical level, of optical signals sent from each terminal 1-2, 2-2, ... n-2 at the optical receiver 42. Moreover, since an optical level at the receiving point does not change, even when many terminals send data simultaneously, resulting in collision of data, the optical receiver 42 is not required to have a wide dynamic range, and high speed response of an automatic gain control function can be realized.

FIG. 5 illustrates a first embodiment where the principle structure of FIG. 4 is adopted to an ISDN user network. The only difference in the structure of FIG. 5 from that of FIG. 1 is that the light souce 10 (laser diode or LED) is provided at the one end of the sending bus 20, and for terminal interfaces 1 through n optical switches 11 through 1n are provided on the sending bus 20 in place of the optical couplers 31 through 3n. Each of the terminal interfaces 1 through n controls the ON and OFF stages of the optical switches 11 through 1n corresponding to the sending of data on the occasion of sending data to the user network interface 41.

For this embodiment, the optical couplers 21 through 2n having the structures indicated in FIGS. 6(a) and (b) can be used. FIG. 6(a) is an optical coupler consisting of a halfmirror 151, which reflects part of the incident light on the optical bus 40 to the terminal and allows the other part of the incident light to continue on the optical bus 40.

FIG. 6(b) is a waveguide type optical coupler wherein an optical waveguide 153 consisting of $SiO_2$ is formed on a Si substrate 152. In this case, part of the incident light from the optical bus 40 is branched and sent to the terminal as in the case of the optical coupler of FIG. 6(a).

FIGS. 7(a) and (b) are diagrams for explaining structure and operation of optical switches 11 through 1n.

The optical switches 11 through 1n have different states. In a first state (ON state), as indicated in FIG. 7(a), an optical signal is output to an output terminal d from an input terminal a, and another optical signal is transmitted to output terminal c from an input terminal b. In a second state (OFF state), as indicated in FIG. 7(b), an optical signal is output to the output terminal c from the input terminal a and another optical signal is output to the output terminal d from the input terminal b.

These optical switches 11 through 1n can be realized by a switching structure in which an optical fiber and a prism are mechanically moved or electrical/optical effect is used. The optical switch utilizing electrical/optical effect has the structure indicated in FIG. 7(c), wherein optical waveguide paths 211 are crossed by diffusing Ti, etc. on a substrate 210 of an electrical/optical effect material such as $LiNbO_3$, etc. Electrodes 212, 213 are formed so that the electrical field is applied to such crossing area, and terminals 214, 215 are connected to those electrodes 212, 213.

When a voltage $V_1$ is applied between the terminals 214, 215, the state illustrated in FIG. 7(a) (ON state) occurs because the optical signal from the input terminal a is output to the output terminal d, while the optical signal to the input terminal b is output from the output terminal c. In addition, when a voltage $V_2$ ($\neq V_1$) is applied between the terminals 214, 215, the state illustrated in FIG. 7(b) (OFF state) occurs because the optical signal to the input terminal a is output from the output terminal c, while optical signal from the input terminal b is output to the output terminal d.

Therefore, the DC light on the sending optical bus 20 is digitally modulated by, as indicated in FIG. 7(c), connecting an optical fiber which forms the sending optical bus 20 to the terminals b and c, and connecting an anti-reflection termination 121 to the output terminal d and changing voltages $V_1$, $V_2$ applied to the optical switches in accordance with digital signals "0" and "1".

Next, a method for making access at each terminal 1-2 through n-2 in FIG. 5 will be explained hereunder with reference to FIGS. 8, 9, and 10.

FIG. 8(a) is a frame format on the receiving bus 40, while (b) is a frame format on the sending bus 20. In the ISDN user network, a frame is formed by a D channel for calling and controlling a send destination party and a B channel for loading data. These channels are led by a frame synchronous signal F and the monitor bit M with which each terminal can obtain the D channel.

FIG. 9 is a block diagram of one of the terminal interfaces 1 through n of FIG. 5 and FIG. 10 is a block diagram of the user network interface 41 of FIG. 5. The data on the receiving bus 40 is input to an optical/electrical converting circuit 91 provided in each of the terminal interfaces 1 through n via the respective optical couplers 21 through 2n. The optical signal is then converted to electrical signal and a waveform of this signal is then shaped by the receiver 93. A frame synchronous circuit 92 receives an output of the receiver 93 and outputs various timing signals through frame synchronization with the frame synchronous signal.

The monitor bit M' and the D channel information are set to the register 94 by the timing signal from the frame synchronous circuit 92. A microprocessor 100 checks the monitor bit M' and the content of the D channel set in the register 94. If a vacant condition of the D channel is detected by the check of the monitor bit M', the D channel can be obtained.

In case a send request is issued from the terminal, the microprocessor 100 controls the ON and OFF states of the optical switches 11 through 1n in order to set its own discrimination signal to the monitor bit M on the sending bus 20. This control is carried out as explained hereunder. Namely, the leading address of a buffer 97 stores the monitor bit M and frame synchronous signal pattern F. Therefore, these are read and an optical switch driver 98 is also driven the optical switch driver 98 outputs voltages $V_1$, $V_2$ in accordance with content of the monitor bit M and frame synchronous signal F read from the buffer 97. An output voltage of the optical switch driver 98 is applied to the optical switch through a delay circuit 99, controlling ON and OFF states of the optical switch (corresponding to FIGS. 7(a) and (b)). Thereby, the DC light on the sending bus 20 becomes an optical signal containing the frame synchronous signal F and the monitor bit M.

In the user network interface 41, the monitor bit M is extracted and this monitor bit M is directly returned to the receiving bus 40. Namely, the returned monitor bit M is loaded on the monitor bit M'.

As explained previously, the monitor bit M' is set to the register 94 and is moreover input to a comparator 96. The comparator 96 always holds the content of monitor bit M transmitted, which is compared with the monitor bit M' input from the register 94. A result of such comparison is then set to the microprocessor 100. When the comparison result is a match, the microprocessor 100 detects that it has loaded the signal for access to the D channel and knows it has the right of making access to the D channel. Under the control of the microprocessor 100, the frame synchronous pattern F, monitor bit M and signal for D channel being stored in the buffer 97 are read therefrom, and are then input to the optical switch driver 98 for the control of optical switch to ON and OFF states. Here, the signal for the D channel means the control information (digital signal) which indicates dial pulse or termination, etc. to be used by switching equipment 46 for line connection, and this D channel signal and B channel signal are sent to the switching equipment 46 through the subscriber network interface 41 and the subscriber line 45.

Next, in case the comparator 96 detects a not-coincidence state, the data is also loaded to the monitor bit M for the D channel access simultaneously from the other terminal interface, suggesting generation of data collision. In this case, the MPU 100 loads the data to the monitor bit M for repeated access to the D channel after the specified period (the time determined in accordance with some random numbers).

In case the MPU 100 knows that it is called by checking the D channel on the receiving bus 40, it stores the signal of B channel on the receiving bus 40 and transfers it to the terminal.

Here, a delay circuit 99 is provided in each terminal interface because of the reason explained hereunder.

When, the transmission time from subscriber network interface 41 to respective terminal interfaces 1 through n is $t_1, t_2, \ldots, t_n$, an internal delay time from reception of data on the receiving bus 40 to start of modulation of DC light on the sending bus 20 at the respective terminal interfaces 1 through n is $T_o$ and the delay time from optical switches 11 through 1n of respective terminal interfaces 1 through n to the subscriber network interface 41 is $T_1, T_2, \ldots, T_n$, the following relation can be obtained.

$$t_1 > t_2 > \ldots > t_n, T_1 > T_2 > \ldots > T_n$$

Therefore, $\alpha_1, \alpha_2, \ldots, \alpha_n$ must be adjusted so that the following relation can be obtained $$t_1 + T_1 + T_o + \alpha_1 = t_2 + T_2 + T_o + \alpha_2 = \ldots$$
$$= t_n + T_n + T_o + \alpha_n$$

in order to correctly receive (the signals transmitted from respective terminal interfaces 1 through n are not overlapped) the frame format indicated in FIG. 8(b) on the sending bus 20 at the optical/electrical converting circuit in the user network interface 41.

Therefore, the delay circuit 99 conceives intrinsic delay time $\alpha_1, \alpha_2, \ldots, \alpha_n$ for respective terminal interfaces 1 through n.

Next, structure and operation of the subscriber network interface indicated in FIG. 5 are explained with reference to FIG. 10.

The ISDN user network is connected with the digital switching equipment 46 from the interface 41 through the optical fibers 45, 45', which comprise the subscriber line. The frame from the switching equipment 46 is transmitted by optical fiber 45', converted into an electrical signal by an O/E converter 109, and input to a receiver 103. On the other hand, the frame from the user network interface 41 is converted into an optical signal by an E/O converter 110, and transmitted to the switching equipment 46 via the optical fiber 45.

The received data is input to a frame synchronous circuit 104 for frame synchronization. The frame synchronous circuit 104 generates various timing signals on the basis of a synchronized clock. The data received by the receiver 103 is stored in a buffer 114, read by the timing signal sent from a frame synchronous circuit 104, input to an electrical/optical converting circuit 43 through an OR circuit 113, converted to optical signal therein and then transmitted to the receiving bus 40. The optical signal on the sending bus 20 is converted to an electrical signal by the photoelectric converting circuit 42 and is then input to a receiver 107. The receiver 107 shapes the waveform of received signal. On the basis of an output signal of the receiver 107, the frame synchronization is established by a frame synchronous circuit 106. The frame synchronous circuit 106 switches a selector 111 to a register side in order to set the monitor bit M indicated in FIG. 8(b) to the register 106. Since the information other than the monitor bit M is transmitted to the switching equipment 46 by a driver 48, the selector 111 is switched to the driver side at the positions other than the monitor bit M. The driver 108 amplifies the signal sent from the receiver 107. This signal is transmitted to the optical fiber 45 via an E/O converter 110 and is then sent to the switching equipment 46.

Here, the frame synchronous circuit 104 outputs the timing signal which indicates the end timing of the frame synchronous pattern to the register 105 in order to send the monitor bit M set to the register 105 to the receiving bus 40 following the frame synchronous pattern of data received by the receiver 103, and then inputs the monitor bit M to the electrical/optical converting circuit 43 through the OR circuit 113. After output of the monitor bit M, the D channel and B channel data following the frame synchronous pattern stored in the buffer 114 are read and are input to the electrical/optical converting circuit 43 through the OR circuit 113. The optical signal is then sent out on the receiving bus 40, and processed in accordance with the operations as explained above in reference to FIG. 5.

In FIG. 5, since respective terminal interfaces control the timing of outputting the send data to the sending bus 20, respective terminal interfaces must be provided the delay circuits 99 having the delay times $\alpha_1, \alpha_2, \ldots, \alpha_n$. However, adjustment of delay times $\alpha_1, \alpha_2, \ldots, \alpha_n$ is very complicated.

The ISDN user network indicated in FIG. 11 has solved such problem. Namely, one end of receiving bus 40 receives the optical signal of the frame format indicated in FIG. 8(a) is transmitted on the receiving bus 40 from the subscriber network interface 41 to an optical/electrical signal converter 50 and a frame synchronous signal generator 51. In the frame synchronous signal generator 51, the same frame synchronous pattern synchronized with the received frame synchronous pattern is output to the optical/electrical converting circuit 52 and the frame synchronous pattern is transmitted to the sending bus 20. The respective terminal interface monitors the frame synchronous pattern on the sending bus 20 through the optical couplers 31 through 3n provided on the sending bus 20 for establishing frame synchronization and sends only the monitor bit M, D channel and B channel signals indicated in FIG. 8(b).

In this case, the frame synchronous pattern on the receiving bus 40 is transmitted to the sending bus 20 in such a form as returning in order to eliminate variation due to difference of accommodating positions of respective terminals by making equal the sum of times T+T'+T", wherein T is the period from the timing of sending the frame synchronous pattern to the receiving bus 40 from the subscriber network interface 41 to the timng of detecting this frame synchronous pattern by respective terminal interfaces, T' is the period from the timing of sending the frame synchronous pattern to the sending bus 20 from the frame synchronous signal generating circuit 51 to detecting such frame synchronous pattern by respective terminal interface and starting transmission of data by the optical switches 11 through 1n and T" is the propagation time of optical signal from the optical switches 11 through 1n to the subscriber network interface 41.

Figure 12:
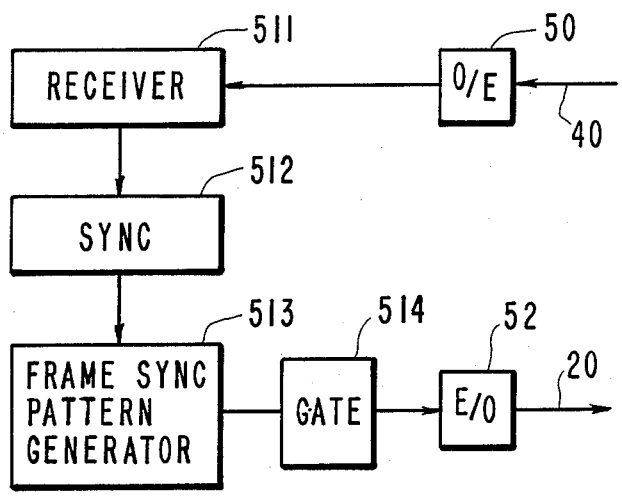
FIG. 12 is a block diagram of a frame synchronous signal generating circuit according to the second embodiment.

The structure of frame synchronous signal generating circuit 51 in FIG. 11 is explained with reference to FIG. 12 and the structure of the terminal interface in FIG. 13. In FIG. 12, the data on the receiving bus 40 is converted to an electrical signal by the photoelectric converting circuit 50 and is shaped in a waveform by a receiving circuit 511. Frame synchronization is established by a frame synchronous circuit 512. The frame synchronous circuit 512 outputs a timing signal to frame synchronous pattern generating circuit 513 at the frame synchronous pattern detecting position, causing it to output the frame synchronous pattern. Of course, this frame synchronous pattern is output in synchronization with the clock signal output from the frame synchronous circuit 513.

The frame synchronous pattern output from the frame synchronous pattern generating circuit 513 is converted to an optical signal by the electrical/optical signal converting circuit 52 via a gate circuit 514, and is then transmitted to the sending bus 20. When an output of the frame synchronous pattern is obtained from the frame synchronous pattern generating circuit 513, the frame synchronous pattern generating circuit 513 continuously outputs a high level or low level signal in order to cause the electrical/optical signal converting circuit 52 to output the DC light.

Figure 13:
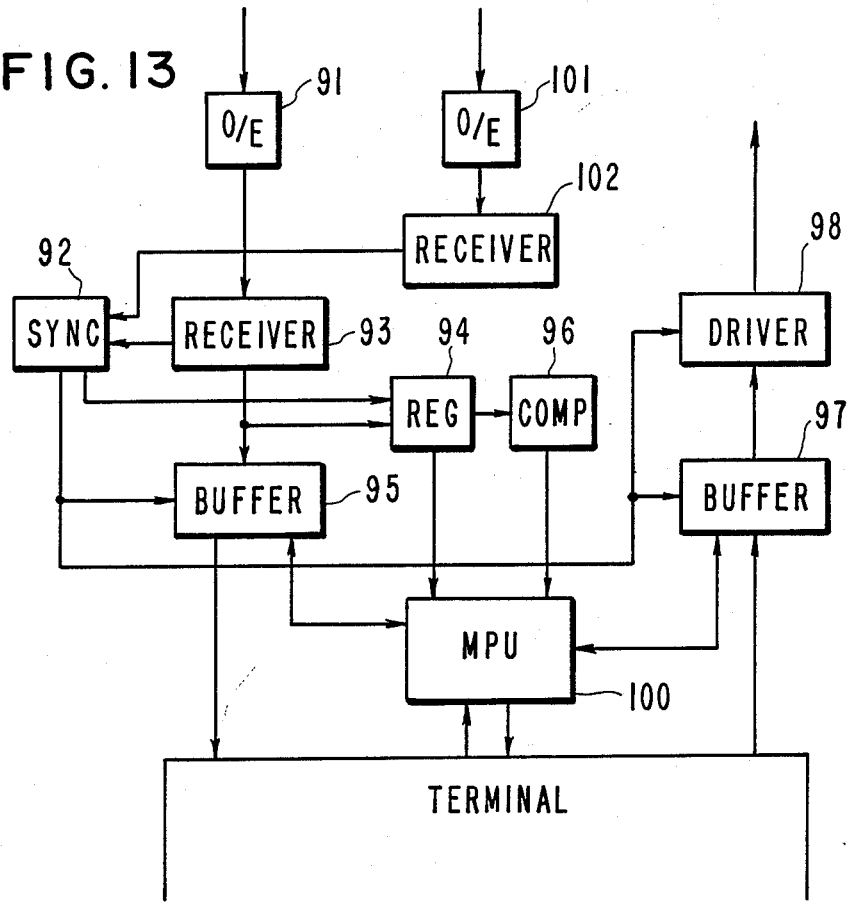
FIG. 13 is a block diagram of a terminal interface.

FIG. 13 is almost the same as the structure of FIG. 9 and like FIG. 9 provides the optical/electrical converting circuit 101, receiver 102 and frame synchronous circuit 103 in order to establish frame synchronization by detecting frame synchronous pattern on the sending bus 20. The frame synchronous circuit 103 outputs the timing signal which indicates the frame synchronous pattern end position on the sending bus 20 to the buffer 97 and optical switch driver 98. Thereby, it becomes possible to send the data by controlling the optical switches 11 through 1n, following the frame synchronous pattern on the sending bus 20.

Here, in the structures indicated in FIG. 5 and FIG. 11, the sending bus and receiving bus are respectively necessary. However, the sending bus and receiving bus can be used in common to each other by employing a so called ping-pong transmission system, and the scale of hardware can be reduced.

Figure 14:
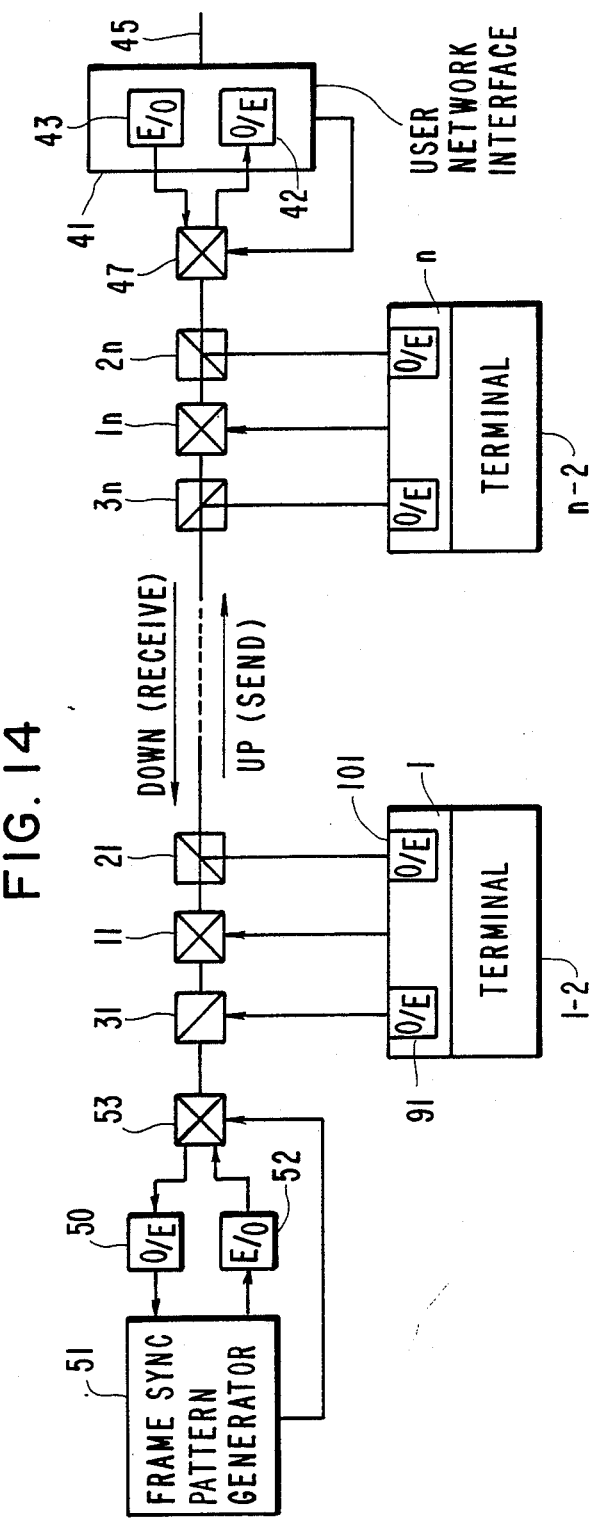
FIG. 14 illustrates a third embodiment of the present invention.
Figure 15:
FIG. 15 is a frame format of the embodiment illustrated in FIG. 14.

FIG. 14 is an example of the system structure when the sending bus and receiving bus are used in common in order to decrease the scale of hardware. FIG. 15 is a time chart of signals on the bus. In the present embodiment, the frame is followed by the end flag E for correspondence to variable length frame.

FIG. 14 is an embodiment where the up-frame is synchronized with the down-frame. In order to realize such synchronization, the frame synchronous signal generating circuit 51 having the function to return the frame is provided at one end of bus. Moreover, second optical couplers 31 through 3n are also provided as the means for receiving and detecting the up-frame signal with respective terminal interfaces 1 through n. Namely, the frame synchronous signal generating circuit 51 establishes frame synchronization using the frame signal of the down-signal obtained through the optical/electrical converting (O/E) element 50. After detection of end flag E, the frame synchronous signal of up-frame indicated in FIG. 15 is transmitted, and the DC light is transmitted after the monitor bit M. The second optical couplers 31 through 3n fetch the up-frame signal and the optical communication information is obtained by causing the relevant optical switches 11 through 1n to make switching operation by the communication information to be sent to the subscriber network interface 41 from respective terminals during establishment of frame synchronization. Reception of down-channel information is carried out in the same way as FIG. 5 and FIG. 11. This embodiment can also be used for maintenance because the second optical couplers 31 through 3n can also be used as the monitoring means for the sending optical communication information (signals modulated by the optical switches 11~1n) of own station.

FIG. 16 is a block diagram of the frame synchronous signal generating circuit 51 in FIG. 14. Operations of this block diagram is almost the same as that of the frame synchronous signal generating circuit of FIG. 12. In this case, however, the structure for ping-pong transmission is added. Such structure will then be explained hereunder.

During reception of the downframe as indicated in FIG. 15, output of the optical switch 53 is switched to the side of optical/electrical converting circuit 50. The detection circuit 515, which operates in synchronization with the clock signal sent from the frame synchronous circuit 512, detects the end flag E of the down-frame. When the detecting circuit 515 has detected the end flag E, the up-frame period starts. At that time, the detecting circuit 515 switches the optical switch 53 to the side of electrical/optical converting circuit 52, opens the gate circuit 514 and informs the frame synchronous circuit 512 of start of up-frame period. The successive operations are same as that in FIG. 12. The end flag E in the up-frame is added to the end of frame of sending data by the respective terminal interfaces which send data using the D channel and B channel.

FIG. 17 is a block diagram of the subscriber network interface 41 of FIG. 14. The structure of FIG. 17 is almost the same as that of FIG. 10, but the necessary structure for ping-pong transmission control is added. This structure is explained hereunder.

When the up-frame is received, an output of an optical switch 47 is connected with the optical/electrical converting circuit 42. The end flag E of up-frame is detected by the detecting circuit 112 which operates in synchronization with the clock signal of the frame synchronous circuit 106. Upon detection of the end flag E, the detecting circuit 112 switches the optical switch 47 to receive input from the electric/optical converting circuit 43 and informs the frame synchronous circuit 104 of the start of sending the downframe. Thereby the frame synchronous circuit 104 reads the data stored in the buffer 114, detects the end position of frame synchronous pattern and adds the monitor bit M' to the trailing part of frame synchronous pattern, thus reading the monitor bit M from the register 105 and outputting it to the electrical/optical converting circuit 43. The successive operations are the same as those of FIG. 10.

The detecting circuit 112 has the function to count up the clock signal sent from the frame synchronous circuit 106 and monitors the detecting time from detection of frame synchronous pattern F to the end flag E. If the end flag E is not detected within the maximum allowable period, it is judged that no data has been transmitted from respective terminal interfaces and the signal for sending the data stored in the buffer 114 is output to the frame synchronous circuit 104 for switching the transmission of the down-frame.

Since the optical bus type communication system indicated in FIG. 14 uses only a single line of optical fiber, it has eliminated one of the above noted problems. But since one optical switch and two optical couplers are used, further simplification of facilities and reduction in cost are necessary.

FIG. 18 is a system structure for eliminating this last noted problem. The user network interface 41 and a plurality of terminals 1-2 through n-2 are bus-connected through a single line of optical fiber cable and the furthest end is provided with the frame synchronous signal generating circuit 51. The optical fiber cable is provided with one optical switch 1n (11) and one optical coupler 5-n (5-1) for each terminal. The optical coupler 5-n has quadruple directivity and functions as the optical coupler for data reception which allows transmission of up-signals and down-signals of the user network interface 41 and each terminal and also functions as the optical coupler for receiving sending frame. Namely, two optical couplers 31, 21; . . . ; 3n, 2n of FIG. 14 are reduced to only one optical coupler 5-1; . . . ; 5-n for each terminal.

The optical fiber cable 71a for data reception and optical fiber cable 71b for sending frame reception are connected to the optical/electrical (O/E) converters 101, 91, respectively, provided between the optical coupler 5-n and the terminal. The optical switch 1n is connected with terminal through a conductive line 71c. Other terminals are also connected with the optical coupler and optical switch in the same way.

The optical switch 1n may be provided in any side of the user network interface 41 or frame synchronous signal generating circuit 51 for the optical coupler 5-n. In case it is provided to the side of frame synchronous signal generating circuit 51, the switching control of optical switch 1n can be realized while setting frame synchronization with the receiving data in the up-frame and thereby timing control can be realized easily. In case the optical switch 1n is provided in the side of user network interface, an output of optical switch 1n can be monitored by the optical coupler 5-n for maintenance and self-diagnosis. In above explanation of operations, the terminal 1-n is considered as an example but this explanation can also be adopted to the other terminals.

In view of eliminating these components to realize further reduction of hardware, an LED is used as the transmitter and receiver of the optical signal. The LED generally functions as the light emitting element and light sensitive element.

In case the structure consisting of the light emitting diode LED, the transistor TR and the amplifier AMP is used as the transmitter and receiver of optical signal, the O/E converting circuit and E/O converting circuit can be integrated. Namely, the O/E.E/O converting circuit can be realized with only one LED, and thereby further cost reduction can be attained.

Figure 19:
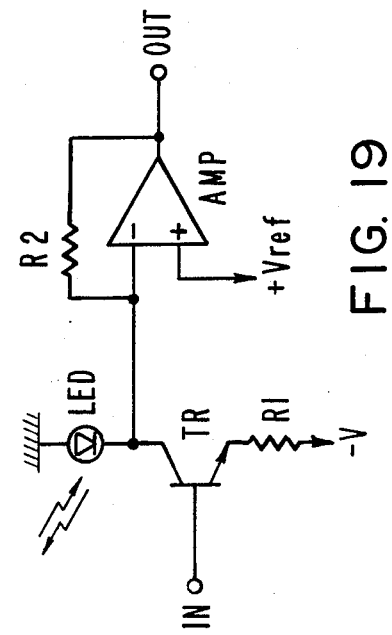
FIG. 19 is a circuit diagram a light sending and receiving circuit.

The light sending and receiving circuit of FIG. 19 can be adopted to FIG. 16 by connecting an output of the gate circuit 514 to the IN terminal, and the OUT terminal to the receiver 511 and then optically coupling the sending/receiving bus with the LED. In the structure of FIG. 16, since the gate circuit 514 is always closed during reception of the down-frame, no data is input to the IN terminal of FIG. 19 and therefore the LED does not emit the light during reception of light. In addition, the sending and receiving bus may directly be coupled with the LED and the optical switch 53 may be eliminated because sending and receiving of light are not conducted simultaneously.

Figure 18A:
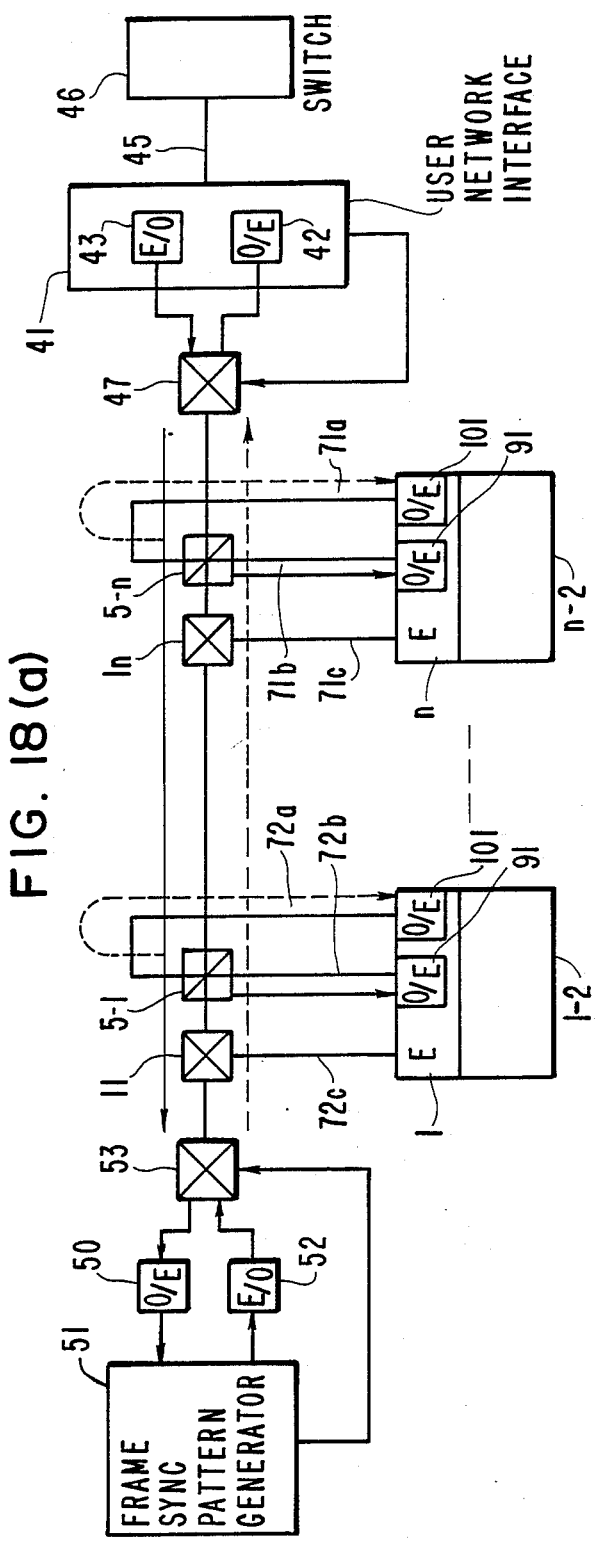
FIG. 18(a) illustrates a fourth embodiment of the present invention.
Figure 18B:
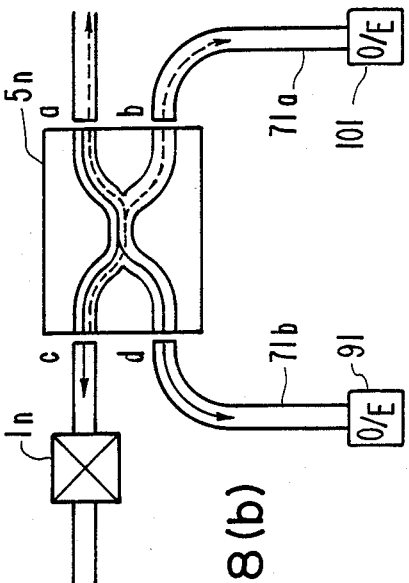
FIG. 18(b) is a diagram for explaining a connecting structure of an optical coupler.

FIG. 18(b) is a diagram for explaining the connecting mode of the optical coupler of FIG. 18(a). The optical signal (indicated by arrow mark associated with the solid line) input from the terminal a is output to the terminal C and it is partly branched and is output to the D terminal. Therefore, the down-frame sent from the subscriber network interface can be monitored by connecting the sending/receiving bus e to the terminals a and C, and the optical/electrical converting circuit 412 for monitoring the receiving bus (down-frame) to the terminal D.

The optical signal (indicated by arrow mark associated with the dotted line) input from the terminal C is output to the terminal a and is partly branched and output to the terminal b. Accordingly, the frame synchronous pattern of the up-frame returned from the frame synchronous signal generating circuit 51 can be monitored by connecting the optical/electric converting circuit 411 for monitoring sending bus (up-frame) to the terminal b. Thus, both up-frame and down-frame can be monitored only with one optical coupler.

In the structures of FIG. 14 and FIG. 18, the subscriber network interface 41 and frame synchronous signal generating circuit 51 respectively require the optical/electrical converting circuits 42, 50, electrical/optical converting circuits 43, 52 and optical switches 47, 53 which execute switching of optical paths for the ping-pong transmission.

In the same way, the light sending and sensitive circuit of FIG. 19 can also be adopted to the user network interface circuit 41 of FIG. 17.

In the system structure of FIG. 14, the other end of sending/receiving bus requires the frame synchronous signal returning part by the frame synchronous signal generating circuit 51. The system structure for eliminating this frame synchronous signal generating circuit 51 is indicated in FIG. 20.

Figure 20:
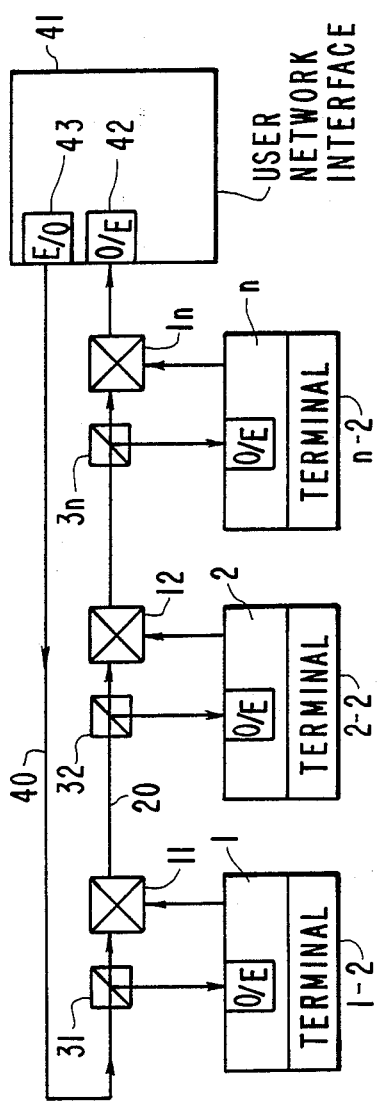
FIG. 20 illustrates a fifth embodiment of the present invention.

In FIG. 20, the end of optical fiber 40 is returned and is connected to the optical fiber 20, thereby forming a loop network around the subscriber network interface 41.

The structure of user network interface 41 in FIG. 20 is almost the same as FIG. 17, but the frame synchronous pattern generating circuit 114 and DC light sending function are added. These components are explained hereunder. When the detecting circuit 112 detects the end flag of the down-frame (receiving frame), the time for sending the up-frame starts, sending the frame synchronous pattern and following DC light. Therefore, the detecting circuit 112 controls the gate circuit 113, connecting an output of frame synchronous pattern generating circuit 114 to the electrical/optical converting circuit 43. In this case, the detecting circuit 112 outputs the signal for detecting the end flag E to the frame synchronous circuit 104. The frame synchronous circuit 104 sends the clock signal to the frame synchronous patern generating circuit 114, also outputs the frame synchronous pattern to the electric/optical converting circuit 43 and continuously outputs the high level or low level signal to cause the electric/optical converting circuit 43 to output DC light, after sending the frame synchronous pattern. Other operations are carried out in the same way as FIG. 17.

The above explanation is adopted to the case where the terminals accommodated in the ISDN user network tries communication with terminals accommodated in the another ISDN user network through users. However, in the actual operating mode, extension line communication between the terminals belonging to the same ISDN user network is necessary. The system control for extension line communication is explained first with reference to the frame formats of FIG. 5, FIG. 11 and FIG. 22.

As indicated in FIG. 22(a), the frame format of receiving bus 40 is employed and the frame format of sending bus 20 is employed as indicated in FIG. 22(b). Namely, the I, I' channels for extension line communication are provided at the trailing part of B channel. The I, I' channels are composed of the CONT area which indicates address information including the sending and receiving terminals and the DATA area loading sending information. At the heading part of CONT area, the special pattern for discriminating I, I' channels is added and thereby respective terminal interface and user network interface 41 are capable of discriminating reception of the I, I' channels through detection of such special pattern. As the procedures for accessing I, I' channels, the well known CSMA/CD system can be employed.

In FIG. 5 and FIG. 11, the extension line communication by the CSMA/CD system can be realized by loading the I channel information set on the sending bus 20 to the I' channel and returning it to the receiving bus 40 for reception by respective terminal interfaces. Therefore, the user network interface 41 is required to have the I channel returning function. This function can be realized with the structure similar to the monitor bit M returning part.

In the CSMA/CD system, moreover, the data transmitted to the sending bus is received by the receiving bus, the sending data is compared with the receiving data. When these are matched, it is discriminated that the data has been transmitted normally. If these are not matched, it is judged that the sending data has collided with the sending data from another terminal interface and the same data is transmitted again. Therefore, each terminal interface is required to provide the function to detect the special pattern added to the leading region of the CONT area of I channel and the function to compare content of I channel with that of I' channel.

These functions of respective terminal interfaces can be realized with the structure similar to that of the comparison part for the monitor bit M.

Figure 21:
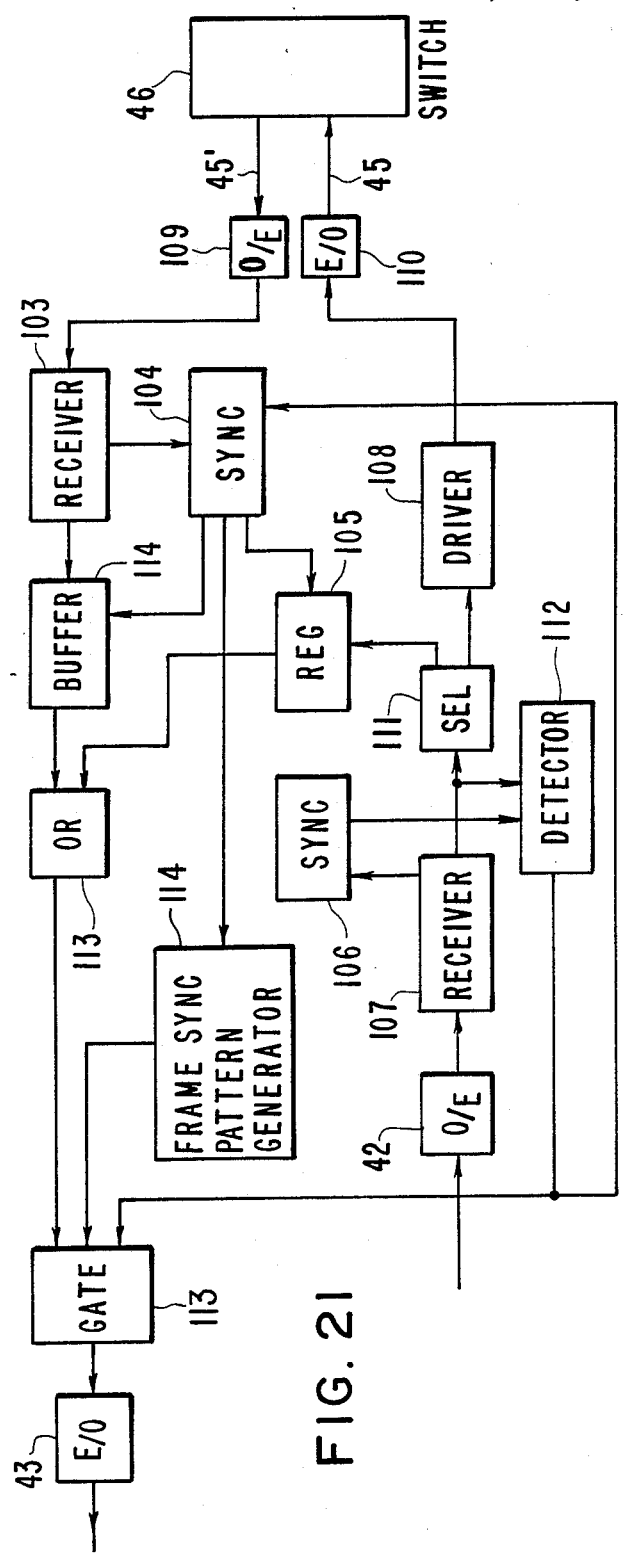
FIG. 21 is a block diagram of a user network interface.

The special pattern detecting function can be realized with the structure similar to the end flag explained with reference to FIG. 16, FIG. 17 and FIG. 21.

The above-explained extension line communication can also be realized even in the system structure of FIG. 14 and FIG. 18 by employing the frame format of FIG. 22.

However, in order to realize said extension line communication, the user network interface must be provided with the function to load the I channel to the I' channel by returning all of the I channel, resulting in an increase of hardware. In addition, as is understood from the procedures of FIG. 22, the data is loaded to the I channel in the up-frame and the returned I' channel is received in the down-frame and therefore communication is possible only once using the I, I' channels. The system structure to solve such problem and access procedures for I channel are explained with reference to FIG. 23 and FIG. 24. FIG. 23 is the frame format. FIG. 23(a) indicates the downframe while (b) the up-frame. FIG. 24 indicates an example of system structure.

Figure 25:
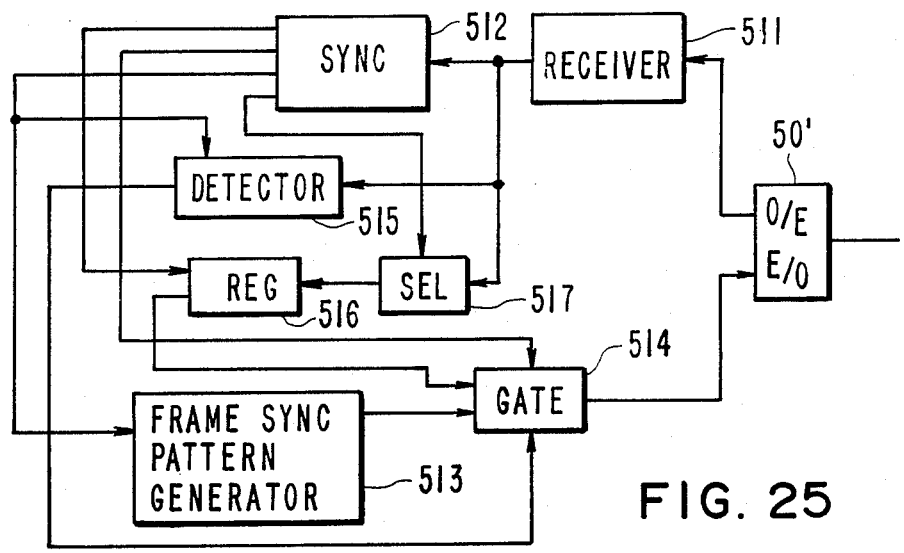
FIG. 25 is a block diagram of a frame synchronous signal generating circuit.
Figure 26:
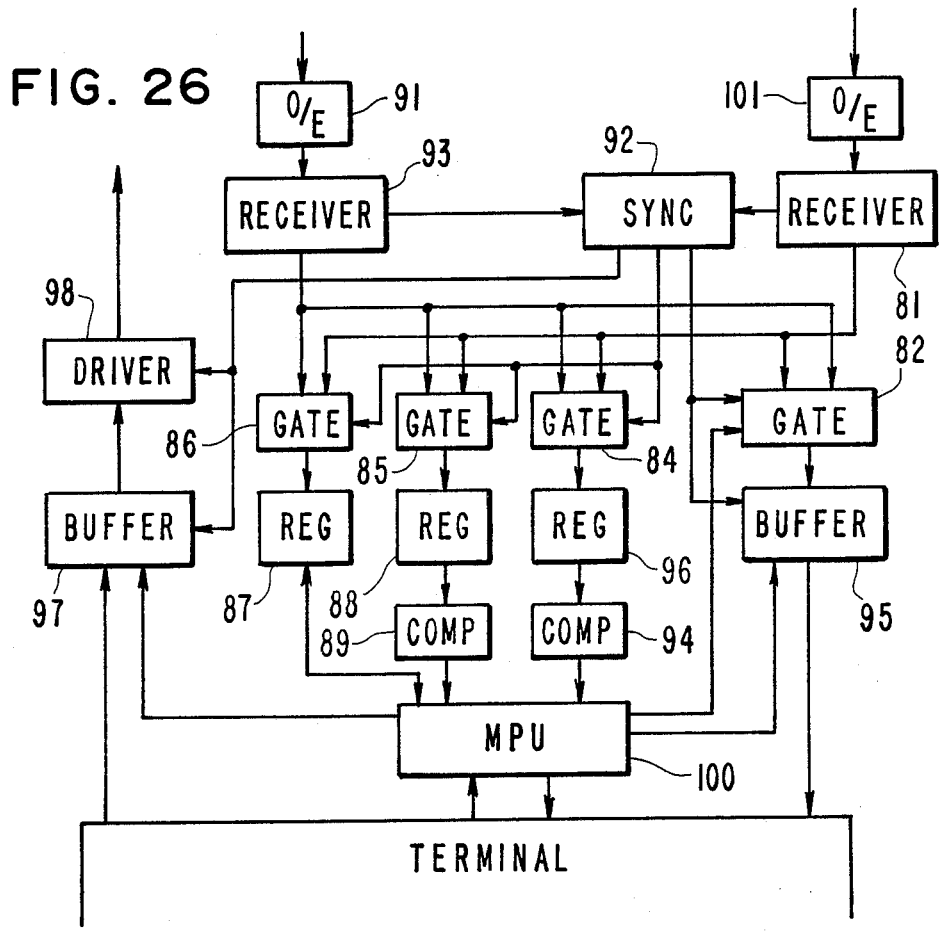
FIG. 26 is a block diagram of a terminal interface.

As is apparent from FIG. 23, the second monitor bits $M_o$, $M_o'$ for making access to the I channel are provided. The user network interface 41 extracts the special pattern in the CONT area of up-frame and loads it to the monitor bit $M_o'$ and returns it as in the case of the monitor bit M described previously, thereby obtaining the right for access to I channel. Moreover, the frame synchronous signal generating circuit 51 also extracts the special pattern of CONT area of the downframe and then returns it by loading it to the monitor bit $M_o$. The structure of user network interface circuit 41 can be realized with the same structure of FIG. 21. In this case, however, the function to send the DC light at the position of I' channel is necessary. Structure of the frame synchronous signal generating circuit 51 and structure of terminal interface are indicated in FIG. 25 and FIG. 26.

The procedures for making access to the I channel of FIG. 24 will then be explained with reference to FIG. 23, FIG. 24, FIG. 25 and FIG. 26. Following explanation symbolizes the extension line communication between the terminal interface 3 of the block 3-2 and the terminal interface 2 of the block 2-2.

The terminal interface 3 receives the down-frame with the receiver 81 (FIG. 26) through the optical/electric converting circuit 101 during the period for sending the down-frame from the user network interface 41. The frame synchronous circuit 92 establishes the frame synchronization by the frame synchronous pattern of the received down-frame and outputs various timing signals for discriminating bit positions of down-frame. The frame synchronous circuit 92 opens the gate 84 at the position of monitor bit M' and sets the monitor bit M' to the register 96.

The comparator 94 holds the monitor bit M transmitted during access to the D channel and compares such monitor bit M with the monitor bit M' set to the register 96. The successive operations are same as those of FIG. 9. In FIG. 26, during use of the D channel, it is stored in the buffer 95 and is then transferred to the terminal because the gate opens at the position of D channel and B channel through the timing control of the microprocessor 100 and frame synchronous circuit 92.

Next, the frame synchronous circuit 92 sends the timing signal to the gate 85 at the position of the monitor bit $M_o'$ and sets the monitor bit $M_o'$ to the register 88. Thereafter, the frame synchronous circuit 92 sets the next CONT area to the register 87 through the gate 86. Moreover, the circuit 92 stores the DATA area of I channel to the buffer 95 through the gate 92. The microprocessor 100 reads the content (CONT) of register 87 and detects that the data has been sent to the terminal accommodated in the terminal interface 3 and then sends the DATA area of I channel stored in the buffer 95 to the terminal. Here, when data is transmitted from the terminal interface 4, 5, 6, . . . , n in FIG. 24, the terminal interface 3 receives the data to own terminal in the I channel within the period of down-frame. The microprocessor 100 detects vacant condition of I channel by chekcing CONT area. If the data for extension line communication is stored in the buffer 97, the microprocessor 100 reads the content (CONT+DATA+E) of I' channel to be transmitted from the buffer 97 and sends it to the driver 98, loading the data to the I' channel by controlling the optical switch 33 to the ON and OFF state.

The terminal interface 2 also receives the downframe, in the same way, from the optical coupler 22 through the optical/electric converting circuit 101. The destination of data of I' channel transmitted from the terminal interface 3 is the terminal accommodated in the terminal interface 2. The microprocessor 100 detects it from the content of CONT area being set to the register 87 and transfers data of DATA area stored in the buffer 95. The response data to the received data of I' channel is transmitted to the terminal interface 3 within the period of the next up-frame.

Structure of frame synchronous signal generating circit 51 almost the same as FIG. 16 but the structure for returning the special pattern provided at the leading part of CONT area by loading it to the monitor bit $M_o$ of I channel is added. Such structure will be explained with reference to FIG. 25. The frame synchronous circuit 512 sends the timing signal to the selector 517 at the position of special pattern of CONT area and sets such special pattern to the register 516. When the detecting circuit 515 detects the end flag E of downframe, the time of up-frame starts. The frame synchronous circuit 512 sends the timing signal to the frame synchronous pattern generating circuit 513 through the gate circuit 514 so that the electric/optical portion of the converting circuit 50' continuously sends the high level or low level signal required for outputting the DC light during the period from the end of frame synchronous pattern F to the end of up-frame. At the position of monitor bit $M_o$, the frame synchronous circuit 512 sends the timing signal for outputting content of the special pattern being set to the register 516 and controls the gate circuit 514 to select the output of register 516 only during the period of monitor bit $M_o$. Therefore, the up-frame is sent to the sending/receiving bus under the condition that the special pattern is loaded on the monitor bit $M_o$ and the DC light is loaded on the I channel.

The terminal interface 2 receives the up-frame at the optical/electric converting circuit 91 through the optical coupler 22'. The receiver 93 shapes waveform of the received up-frame signal. In case the vacant condition of I channel is detected from the content of CONT area being set to the register 111, the receiver 93 controls the optical switch 32 for the ON and OFF states and loads the send data to the I channel.

The terminal interface 3 receives the up-frame at the optical/electric converting circuit 91 through the optical coupler 23'. The monitor bit $M_o$ returned by the frame synchronous signal generating circuit 51 under the control of frame synchronous circuit 92 is set to the register 106. The comparator 109 holds the special pattern returned by said down-frame and compares such special pattern with the content of register 106. The microprocessor 100 judges that the preceding data transmission has been completed normally when the comparison result matches. If it does not match, it means that some trouble has occurred. In this case, the data is transmitted again or fault analysis is carried out.

As explained previously, the extension line communication can be realized only with simple hardware structure and moreover the down-frame and up-frame channels can be used by two terminal interfaces.

Figure 27:
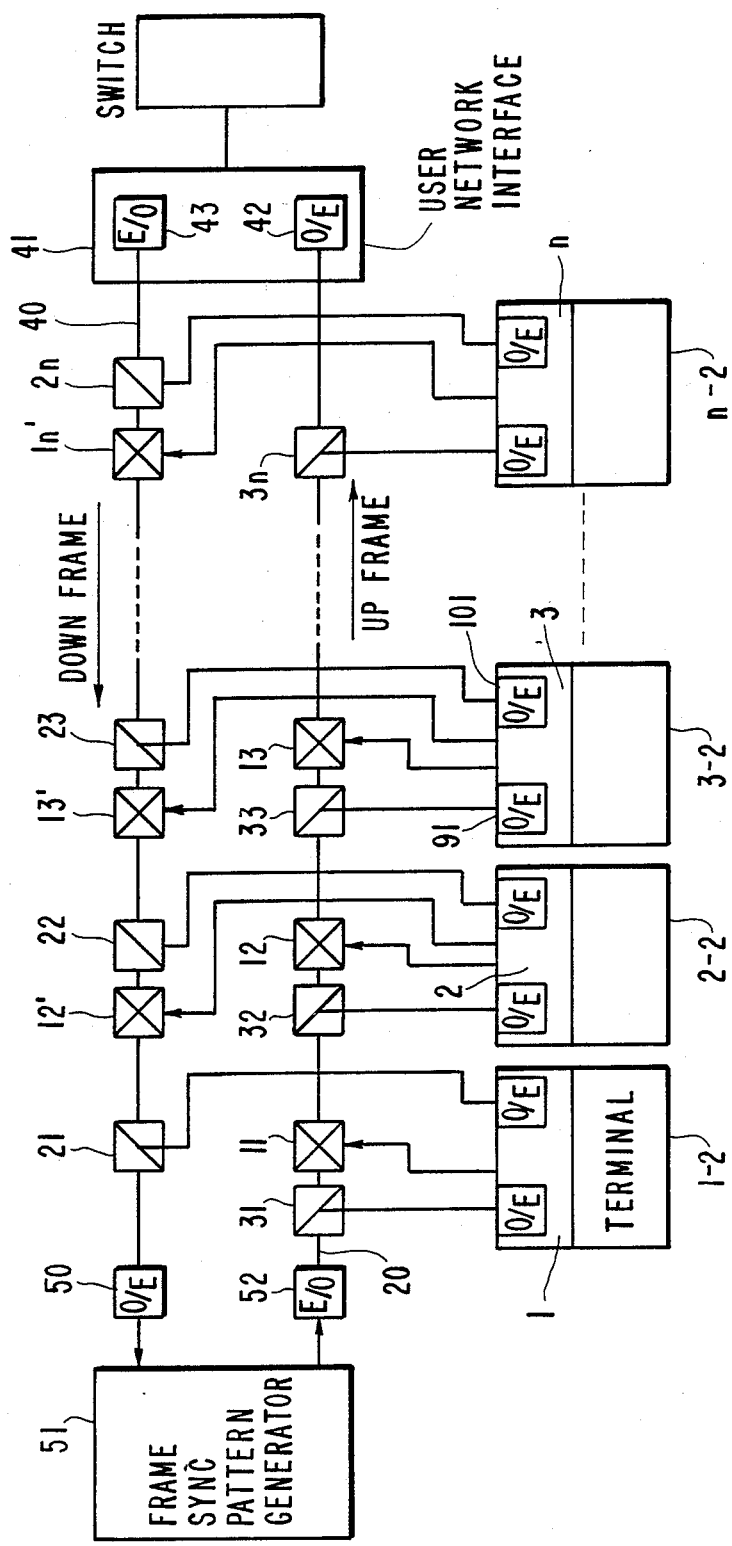
FIG. 27 illustrates a seventh embodiment of the present invention.

FIG. 27 is a system structure in case the extension line communication between terminals is carried out with the system structure of FIG. 11. In this case, the extension line communication is carried out using the frame format of FIG. 23. In FIG. 27, the structure of subscriber network interface 41 is the same as that of frame synchronous signal generating circuit 51.

The down-frame on the receiving bus 40 is branched to the terminal interfaces 1, 2, 3, . . . , n by the optical couplers 21, 22, . . . , 2n. In case the vacant state of I' channel is detected, data is loaded to the I' channel by controlling the optical switches 12', 13', . . . , 1n' for the ON and OFF states.

The up-frame on the sending bus 20 is branched to the terminal interface 1, 2, 3, . . . , n by the optical couplers 31, 32, . . . , 3n. When the vacant state of I channel is detected, data is loaded to the I channel by controlling the optical switches 11, 12, 1n-1 for the ON and OFF states.

The terminal interface 1 is not provided with the optical switch on the receiving bus 40 and the terminal interface n is not provided with the optical switch on the sending bus 20 because the terminal interfaces 1, n cannot realize extension line communication using the receiving and sending bus, as is obvious from FIG. 27.

In FIG. 24, when each terminal interfaces 1 through n has the delay circuits 99 having the delay times $\alpha_1$, $\alpha_2$ ... $\alpha_n$, as explained for FIG. 5, and each of the optical couplers 21 through 2n is connected as indicated in FIG. 18(a) and FIG. 18(b), optical couplers 21' through 2n' are not necessary. Because sending timing on up-frame is determined by the delay circuits and both up-frame and down-frame can be received via optical coupler 21 through 2n.

What is claimed is:

1. An optical bus type communication system comprising:
   a first bus type transmission line consisting of optical fiber;
   a light source, provided at a first end of said bus type transmission line, for sending a first optical signal having a constant level to said first bus type transmission line;
   a plurality of optical switches on said first bus type transmission line;
   a plurality of terminal interfaces, one connected and corresponding to each of said optical switches for digitally modulating the first optical signal which passes through said first bus type transmission line by switching of said optical switches corresponding to data to be sent to said first bus type transmission line;
   a main station, provided at a second end of said first bus type transmission line, having first receiving means for receiving said digitally modulated optical signal;
   a second bus type transmission line consisting of an optical fiber connected at a second end to said main station;
   sending means, provided at said main station, for sending a second optical signal on said second bus type transmission line; and
   a plurality of first optical couplers, mounted on said second bus type transmission line, one connected and corresponding to each of said terminal interfaces, said terminal interfaces receiving the second optical signal being transmitted through said second bus type transmission line via said corresponding first optical couplers,
   wherein said optical signals on said first and second transmission lines are frame format signals including a frame synchronous pattern and a monitor bit, and said main station has return means for loading the monitor bit received from said first bus type transmission line to the monitor bit of said second bus type transmission line, and
   wherein said terminal interfaces have control means for controlling the corresponding optical switches and for loading specific patterns to said monitor bit when said terminal interfaces make access to the frame format signal of said first bus type transmission line, and comparison means for receiving the monitor bit returned to the second transmission line from said main station and for comparing said monitor bit with said specific pattern.

2. An optical bus type communication system according to claim 1, wherein said terminal interfaces discriminate whether the right to use said first optical siganl can be obtained or not from the comparison result of said comparison means.

3. An optical bus type communication system according to claim 1, further comprising:
   second receiving means, provided at a first end of said second bus type transmission line, for receiving the optical signal transmitted from said main station; and
   return means, provided at the first end of said second bus type transmission line, for modulating said light source with the frame synchronous pattern of the received optical signal and for returning said frame synchronous pattern to said first transmission line.

4. An optical bus type communication system according to claim 3, further comprising:
   a plurality of second optical couplers, mounted on the first bus type transmission line, one connected and corresponding to each of said terminal interfaces.

5. An optical bus type communication system according to claim 4, wherein each of said second optical couplers is mounted on said first transmission line closer to said light source than said optical switch associated with the corresponding terminal interface, and said terminal interfaces have synchronization means for synchronizing with the frame synchronous pattern, on said second transmission line, received through said corresponding first optical coupler, and for synchronizing with the frame synchronous pattern, on said first transmission line, received through said corresponding second optical coupler, and timing control means for switching said optical switches based on the timing signal from said synchronization means.

6. An optical bus type communication system comprising:
   a bus type transmission line consisting of optical fiber;
   sending/receiving means, provided at a first end of said bus type transmission line, having receiving means for receiving a first optical signal from said bus type transmission line and sending means for sending a second optical signal having a constant level to said bus type transmission line;
   a main station, provided at a second end of said bus type communication line, having receiving means for receiving the second optical signal from said bus type transmission line and sending means for sending the first optical signal to said bus type transmission line;
   a plurality of optical switches mounted on said bus type transmission line;
   a plurality of first optical couplers mounted on said bus type transmission line; and
   terminal interfaces, each one corresponding and connected to one of said optical switches and one of said first optical couplers, having modulation means for digitally modulating the second optical signal passing through said bus type transmission line by switching of said optical switches corresponding to data to be sent to said bus type transmission line, and receiving means for receiving the first optical signal on said bus type transmission line through said optical couplers so that transmission of the first and the second optical signals is realized on a time division basis,
   wherein said first optical couplers branch the first optical signal to said terminal interfaces and branch the second optical signal sent from said sending-/receiving means to said terminal interfaces.

7. An optical bus type communication system according to claim 6, wherein said sending/receiving means include an LED which functions as the sending means and the receiving means.

8. An optical bus type communication system according to claim 6, wherein said main station includes an LED which functions as the sending means and the receiving means.

9. An optical bus type communication system according to claim 6, wherein said first and second optical signals on said bus type transmission line are frame format signals including a frame synchronous pattern and a monitor bit, and said main station has return means for loading the monitor bit of the second optical signal to the monitor bit of the first optical signal.

10. An optical bus type communication system according to claim 9, wherein said terminal interfaces have control means for controlling the corresponding optical switches and for loading specific patterns to said monitor bit of the second optical signal when said terminal interfaces make access to the the second optical signal, and comparison means for receiving the monitor bit of the first optical signal returned from said main station and for comparing said monitor bit with said specific pattern.

11. An optical bus type communication system according to claim 10, wherein said terminal interfaces discriminate whether the right to use the second optical signal can be obtained or not from the comparison result of said comparison means.

12. An optical bus type communication system according to claim 9, wherein said sending/receiving means further comprises return means for modulating said second optical signal with the frame synchronous pattern of the first optical signal and for loading said frame synchronous pattern on said second optical signal to said transmission line.

13. An optical bus type communication system according to claim 12, further comprising:
   a plurality of second optical couplers, mounted on the bus type transmission line, one connected and correspnding to each of said terminal interfaces.

14. An optical bus type communication system according to claim 13, wherein each of said second optical couplers is mounted on said transmission line closer to said sending/receiving means than the optical switch associated with the corresponding terminal interface, and said terminal interfaces have synchronization means for synchronizing with the frame synchronous pattern of said first optical signal, received through said first optical coupler, and for synchronizing with the frame synchronous pattern of said second optical signal, received through said second optical coupler, and timing control means for switching said optical switches based on the timing signal from said synchronization means.

15. An optical bus type communication system comprising:
   a bus type transmission line consisting of optical fiber,
   sending/receiving means, provided at a first end of said bus type transmission line, having receiving means for receiving a first optical signal from said bus type transmission line in a first mode and sending means for sending a second optical signal having a constant level to said bus type communication line in a second mode;
   a main station, provided at a second end of said bus type communication line, having receiving means for receiving the second optical signal from said bus type transmission line in the second mode and sending means for sending the first optical signal having a constant level to said bus type transmission line in the first mode;
   a plurality of optical switches mounted on said bus type transmission line;
   a plurality of first couplers mounted on said bus type transmission line; and
   terminal interfaces, each one corresponding and connected to one of said first optical couplers and one of said optical switches, having modulation means for digitally modulating the second optical signal passing through said bus type transmission line by switching of said optical switches corresponding to data to be sent to said bus type transmission line, and receiving means for receiving the first optical signal on said bus type transmission line through said optical couplers,
   wherein said first and second modes are on a time division basis,
   said first and second optical signals are frame format signals including a frame synchronizing pattern and a channel for communication between said terminal interfaces,
   each of said terminal interfaces loads sending data for the terminal interfaces on a down side of the bus type transmission line therefrom in the first or second mode on said channel by controlling the corresponding optical switches, said terminal interfaces on the down side of the bus type transmission line receive said sending data on said channel via said corresponding optical coupler, said first and second optical signals on said bus type transmission line include a monitor bit, said terminal interfaces have control means for controlling the corresponding optical switches and for loading specific patterns to said channel of the first and second optical signals when said terminal interfaces make access to the channel of the first and second optical signals, and comparison means for receiving the monitor bit of the first and second optical signals and for comparing it with said specific pattern, and said main station and said sending/receiving means have return means for loading the received said specific pattern to said monitor bit and for returning said specific pattern.

16. An optical bus type communication system comprising:

first and second type transmission lines consisting of optical fibers;

sending/receiving means, provided at a first end of said first and second bus type transmission lines, having receiving means for receiving a first optical signal from said second bus type transmission line in a first mode and sending means for sending a second optical signal having a constant level to said first bus type communication line in a second mode;

a main station, provided at a second end of said first and second bus type communication lines, having receive means for receiving the second optical signal from said first bus type transmission line in the second mode and send means for sending the first optical signal having a constant level to said second bus type transmission line in the first mode;

a plurality of optical switches mounted on said first and second bus type transmission lines;

a plurality of optical couplers mounted on said first and second bus type transmission lines; and terminal interfaces, each one corresponding and connected to one of said optical switches and one of said optical couplers, having modulation means for digitally modulating the second and first optical signals passing through said first and second bus type transmission lines by switching said optical switches corresponding to data to be sent to said first or second bus type transmission lines, and receive means for receiving the second and first optical signals on said first and second bus type transmission lines through said optical couplers, wherein said first and second optical signals are frame format signals each including a frame synchronizing pattern and a channel for communication between said terminal interfaces, each of said terminal interfaces loads sending data for the terminal interfaces on a downside of the first and second bus type transmission lines therefrom in the second or first mode on said channel by controlling the corresponding optical switches, and said terminal interfaces on a downside of the first and second bus type transmission lines receive said sending data, in the second and first mode, on said channel via the corresponding optical couplers.

17. An optical bus type communication system according to claim 16, wherein said second and first optical signals on said first and second bus type transmission lines include a monitor bit, said terminal interfaces have control means for controlling the corresponding optical switches for loading specific patterns to said channel of the first and second optical signals when said terminal interfaces make access to the channel of the first and second optical signals, and comparison means for receiving the monitor bit of the first and second optical signals and for comparing the monitor bit with said specific pattern, and said main station and said sending/receiving means have return means for loading the received specific pattern to said monitor bit and for returning said specific pattern.

18. An optical bus type communication system comprising:

a bus type transmission line consisting of a U-shaped optical fiber, send means, provided at the one end of said bus type transmission line, for sending an optical signal having a constant level and a modulated optical signal to said bus type transmission line;

receive means, provided at a second end of said bus type transmission line, for receiving said optical signal from said bus type transmission line;

a plurality of optical switches mounted on said bus type transmission line;

a plurality of optical couplers mounted on said bus type transmission line; and terminal interfaces, each one corresponding and connected to one of said optical switches and one of said optical couplers, for digitally modulating the optical signal which passes through said bus type transmission line by switching said optical switches corresponding to data to be sent to said bus type transmission line, and for receiving the modulated optical signal in said bus type transmission line through said optical couplers so that said send means transmits the modulated optical signal on a time division basis.

* * * * *